3,492,787
METHOD AND SYSTEM FOR DEHYDRATING GAS STREAMS
Robert E. McMinn, Oklahoma City, Okla., assignor to Black, Sivalls & Bryson, Inc., Kansas City, Mo., a corporation of Delaware
Filed Feb. 5, 1968, Ser. No. 703,051
Int. Cl. B01d 53/14, 53/04
U.S. Cl. 55—31     12 Claims

ABSTRACT OF THE DISCLOSURE

The present invention relates to an improved method and system for dehydrating gas streams where relatively large dew point depressions are required, and more particularly, to a method and system for absorbing water vapor from a gas stream with a first portion of lean liquid absorbent of moderate concentration in a first stage, then absorbing additional water vapor from said gas stream with a second portion of lean liquid absorbent of high concentration in a second stage, all of the resultant rich liquid absorbent then being combined, reconcentrated and recirculated to said first and second stages.

BACKGROUND OF THE INVENTION

The present invention relates to a method and system for dehydrating gas streams where relatively large water dew point depressions are required—for example, 150° to 200° F.

Systems for drying gas streams such as natural gas by passing them in intimate contact with a liquid absorbent such as triethylene glycol or diethylene glycol are well known. Also, it is well known that the water dew point depression obtainable in such systems is dependent upon how pure the liquid absorbent is, and the amount of contact that takes place between the gas stream and the liquid absorbent. That is, the purity of the liquid absorbent determines the maximum equilibrium condition that may be reached between the gas stream and liquid absorbent, while the amount of contact between the gas stream and the liquid absorbent determines the extent to which such equilibrium condition is reached. The maximum equilibrium condition is used herein to mean the condition at which the distribution of water between the absorbent and gas stream is such that a maximum quantity of water is distributed in the absorbent.

In recent years methods and systems have been developed for reconcentrating liquid absorbent-water solutions to a high degree of purity. For example, in U.S. Patent 3,105,748 of W. Stahl, a method and system is described in detail for drying gas with a liquid absorbent and reconcentrating the absorbent to a purity of 99.5% to 99.8% by weight.

However, such methods and systems require that all the liquid absorbent be concentrated to the same purity, and in applications where water dew point depressions above 130° to 140° F. are required, such systems have generally proven to be uneconomical, even where liquid absorbent concentrations of 99.8% by weight are utilized. This is primarily due to the large flow rates of liquid absorbent required to achieve the proper amount of contact and resultant large and expensive equipment. As a result, it has been the practice in the industry heretofore to utilize processes incorporating dry desiccant such as that known in the trade as "molecular sieve" or "solva bead" for most applications where high dew point depressions are required instead of liquid systems.

By the present invention there is provided a method and system for dehydrating a gas stream with a liquid absorbent which will achieve water dew point depressions as high as 200° F., but which requires substantially less equipment than comparable liquid absorbent systems heretofore known. Also, by this invention there is provided a method and system for dehydrating a gas stream which can achieve comparable water dew point depressions with dry desiccant systems but requiring substantially less costly equipment.

SUMMARY OF THE INVENTION

By the present invention a method and system for dehydrating a gas stream is provided wherein said gas stream is intimately contacted with a liquid absorbent such as a triethylene glycol-water solution in two successive stages within a contactor vessel. The gas stream is first contacted with lean liquid absorbent of a moderate concentration in a first stage within a contactor vessel so that the major portion of the water to be removed from said gas stream is absorbed. The gas stream is then contacted by lean liquid absorbent of a high concentration in a second stage within said contactor vessel so that the desired final portion of the water to be removed is absorbed and the desired gas stream water dew point depression is obtained. The resultant rich liquid absorbent streams are combined and introduced into a reconcentrator vessel after passing through heat exchange means. Said reconcentrator vessel includes heating means for heating the rich liquid absorbent solution to a temperature high enough to vaporize most of the absorbed water contained therein, but not so high that the liquid dessicant decomposes. The vaporized water is removed from said reconcentrator vessel and the resulting lean liquid absorbent of moderate concentration is divided into a first portion and a second portion. The first portion is cooled by heat exchange means and circulated by pump means to said first stage within said contactor vessel. The second portion of lean liquid absorbent is further concentrated to a high concentration or purity and then conducted to an accumulator vessel where heat is removed from it by heat exchange means disposed therein. Said second portion of lean liquid absorbent is then circulated by a second pump means to said second stage of said contactor vessel.

Thus, a method and system for dehydrating a gas stream is provided wherein very high gas stream water dew point depressions may be obtained requiring substantially smaller and less costly equipment than is required for heretofore known systems. For example, a 100 million standard cubic feet per day stream of natural gas saturated with water at flowing conditions of 100° F. and 1050 p.s.i.a. contains approximately 60 pounds of water per million standard cubic feet. Utilizing triethylene glycol in the method and system described and claimed in the aforementioned patent to Stahl, to remove substantially all the water and obtain a minus 100° F. dew point, a reconcentrator with a heating capacity of 4.0 million B.t.u. per hour and a 50 horsepower glycol pump would be required. Utilizing the present invention for the same natural gas stream, a minus 100° F. water dew point effluent stream could be obtained with a reconcentrator of approximately 2.0 million B.t.u. per hour heating capacity and a total of approximately 25 pump horsepower. In addition, less dry gas for superdrying the glycol would be required with the present invention.

It is, therefore, an object of the present invention to provide a method and system for dehydrating gas streams with liquid absorbent wherein very high gas stream water dew point depressions may be obtained.

A further object of the present invention is the provision of a method and system for dehydrating gas streams, within very high gas stream water dew point depressions may be obtained requiring substantially smaller and less costly equipment than heretofore known systems.

Still a further object is the provisions of a method and system for reconcentrating a combined stream of rich liquid absorbent and dividing it into two portions, one of moderate concentration and one of very high concentration.

Yet a further object is the provision of a method and system for dehydrating a gas stream by contacting it with liquid absorbent in two successive stages within a single contactor vessel.

Other and further objects, features and advantages will be apparent from the following description of presently preferred embodiments of the invention, given for the purpose of disclosure and taken in conjunction with the accompanying drawing.

DESCRIPTION OF THE DRAWINGS

In the drawings forming a part of the disclosure herein, like character references designate like parts throughout the several views wherein.

DESCRIPTION OF THE PREFERRED EMBODIMENT

Figure 1:
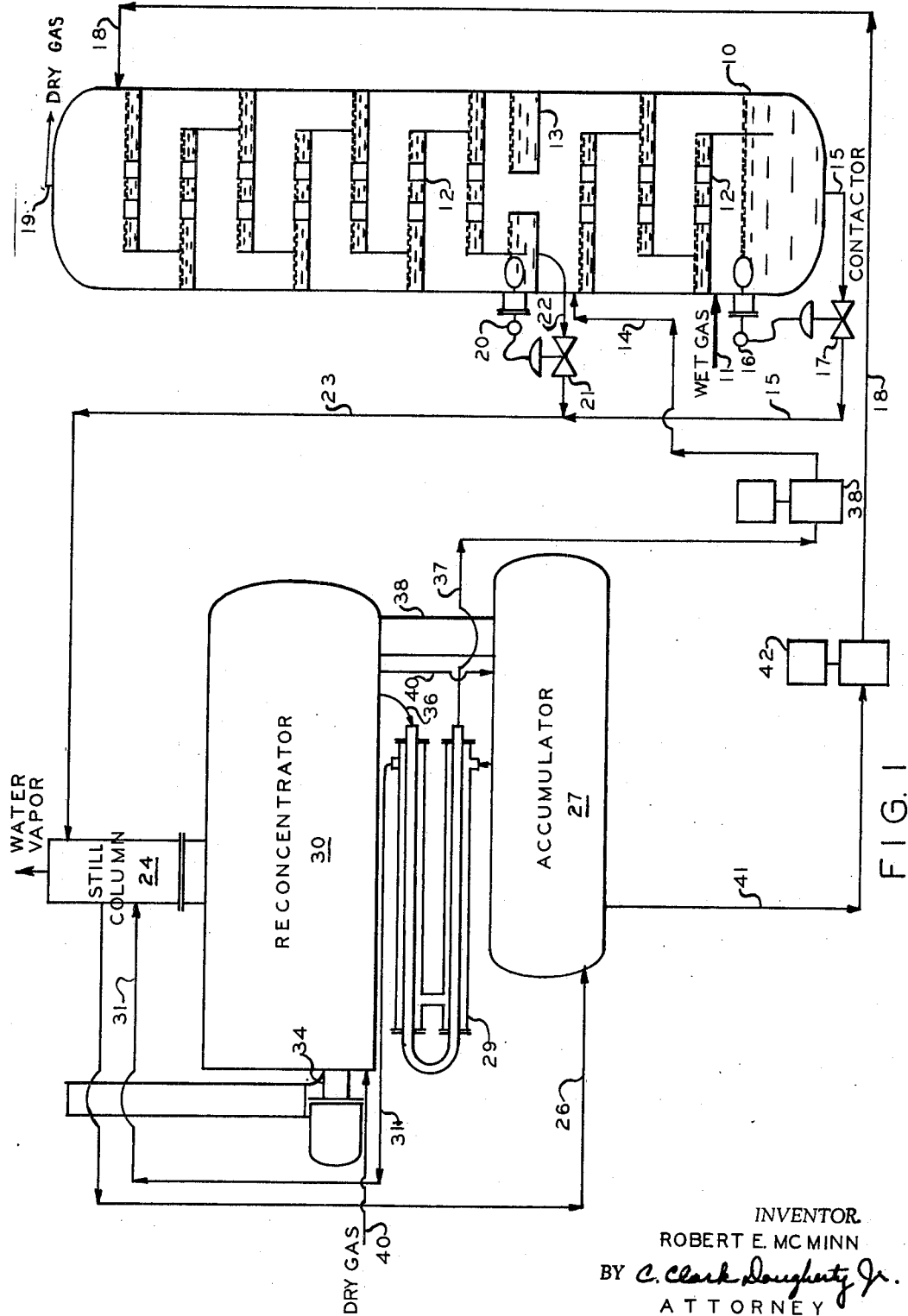
FIGURE 1 is a diagrammatic view of the system of the present invention.

Referring now to the drawings, and particularly to FIGURE 1, a wet gas stream enters the bottom portion of contactor 10 through conduit 11 and passes upwardly through a plurality of conventional vapor-liquid contact trays 12. Before reaching chimney tray 13 said wet gas is contacted by liquids absorbent of moderate concentration, such as a 98.1% triethylene glycol by weight water solution, entering contactor 10 through conduit 14 and passing downwardly over vapor-liquid contact trays 12. Thus said wet gas is partially dried by contacting liquid absorbent of moderate concentration in a first stage within contactor 10. Rich liquid absorbent containing absorbed water accumulates in the bottom area of contactor 10 from where it passes into conduit 15. A conventional liquid level controller 16 coacts with conventional control valve 17 to maintain a constant level of rich absorbent in the bottom area of contactor 10 thereby preventing gas from passing into conduit 15.

The partially dried gas passes through chimney tray 13 and into a second stage of contact within contactor 10. Chimney tray 13 may be of any conventional type which functions to allow gas to pass upwardly through it but prevents liquid absorbent from passing downwardly. Liquid absorbent accumulating on chimney tray 13 passes into conduit 22. A conventional liquid level controller 20 coacts with a conventional control valve 21 to maintain a constant level of rich absorbent on chimney tray 13 thereby preventing gas from entering conduit 22.

The partially dried gas passing through chimney tray 13 passes upwardly through a second plurality of vapor-liquid contact trays 12 within contactor 10 and is contacted by liquid absorbent of high concentration, such as a 99.99% triethylene glycol by weight water solution, entering conactor 10 through conduit 18. The high con-concentration liquid absorbent absorbs additional water vapor from said gas stream thereby reducing the gas stream water dew point to the desired level. The thus dried gas stream passes out of contactor 10 through conduit 19.

It should be noted that the majority of water to be removed from the gas stream being dried is removed in the first stage of contact within contactor 10. Consequently the rate of liquid absorbent of moderate concentration entering said first stage is normally greater than the rate of liquid absorbent of high concentration entering said second stage of contact within contactor 10. The number of trays required in each of said stages of contact and the specific rates of liquid absorbent required for each of said stages for dehydrating a particular gas stream are readily determinable by one skilled in the art utilizing known design data and engineering principals. Therefore, no further description is deemed necessary for purposes of this disclosure.

The rich liquid absorbent passing out of contactor 10 through conduits 15 and 22 are combined and passed into conduit 23.

Figure 2:
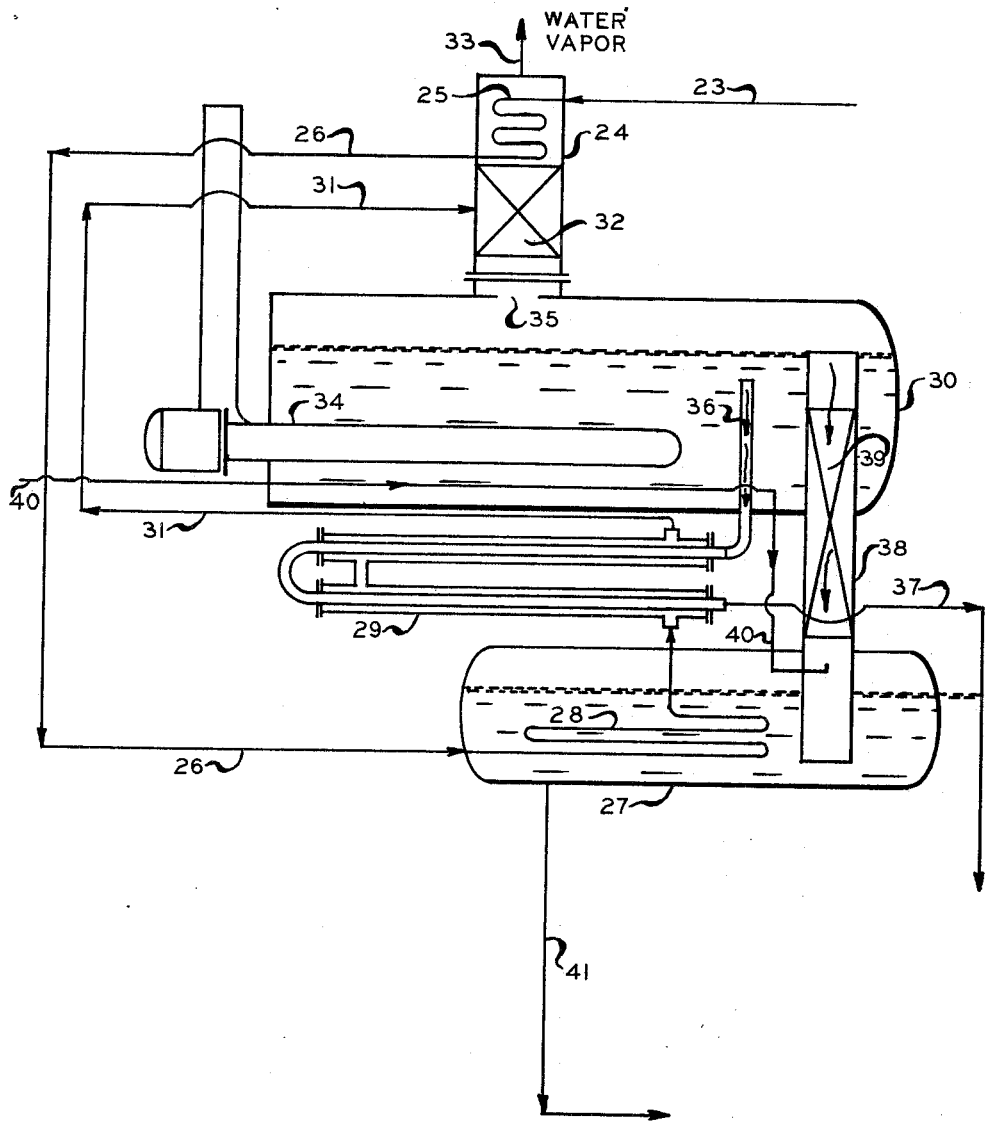
FIGURE 2 is a more detailed diagrammatic view of the still column, reconcentrator and accumulator of FIGURE 1.

Referring now to both FIGURE 1 and FIGURE 2, the combined stream of rich liquid absorbent enters a conventional heat exchange coil 25 disposed in the top portion of still column 24. Heat is exchanged the relatively cool rich liquid absorbent stream and hot water vapor, vaporized absorbent and other hot vapors passing upwardly within still column 24 thereby heating the rich liquid absorbent stream and cooling and condensing some absorbent and water vapor as will be hereinafter described further.

The rich liquid absorbent stream then passes into conduit 26 and into a conventional heat exchange coil 28 disposed within accumulator 27 where it is heated further through heat exchange with hot lean liquid absorbent accumulated therein. From heat exchange coil 28 said rich liquid absorbent stream enters a conventional shell and tube type of heat exchanger 29, where it is still further heated through heat exchange with hot lean liquid absorbent passing out of reconcentrator 30. From heat exchanger 29 the now pre-heated rich liquid absorbent stream is passed into still column 24 through conduit 31.

Still column 24 contains a conventional packed section 32 which functions to bring about intimate contact between vapors passing upwardly therethrough with liquids passing downwardly. Water and small amounts of absorbent vaporized in reconcentrator 30 pass upwardly through packed section 32 within still column 24 and over heat exchange coil 25. Some of the water vapor and substantially all of the absorbent contacting heat exchange coil 25 are condensed thereby creating reflux and bringing about good separation between absorbent and water vapor. Water vapor passing through still column 24 and past heat exchange coil 25 passes out of still column 24 through conduit 33.

The preheated rich liquid absorbent steam entering still column 24 through conduit 31 passes through at least a part of packed section 32 so that some water vapor is stripped out of it by virtue of its contact with water and other vapors passing upwardly therethrough. It then enters reconcentrator 30 through opening 35. Reconcentrator 30 includes conventional heat source 34 disposed within its lower portion so that heat is transferred to liquid absorbent contained therein. The temperature of the liquid absorbent solution contained within reconcentrator 30 is controlled by conventional means at a constant temperature. For example, for triethylene glycol, a temperature of approximately 365° F., is maintained. At this bulk heat level triethylene glycol will reach a moderate percentage reconcentration of approximately 98.1% by weight through the application of heat and resulting distillation process. Thus lean liquid absorbent of moderate concentration is produced within reconcentrator 30 by the application of heat alone.

A portion of the lean liquid absorbent of moderate concentration within reconcentrator 30 passes into conduit 36 which is disposed vertically within the lower portion of reconcentrator 30 below the level of lean liquid absorbent therein. From conduit 36 said absorbent passes by gravitational force through heat exchanger 29 where it is cooled, and then into conduit 37. Conduit 37 leads to the suction side of pump 38 from where said liquid absorbent is pumped into conduit 14 and then into contactor 10.

A second portion of the lean liquid absorbent of moderate concentration within reconcentrator 30 passes into conduit 38 which is disposed vertically within reconcentrator 30. Conduit 38 is placed at a height above conduit 36 and is positioned so that the level of liquid absorbent within reconcentrator 30 is held well above heat source 34. Conduit 38 contains a conventional packed section 39 which brings about intimate contact between liquids and vapors passing therethrough. The lean liquid absorbent of moderate concentration passing downwardly within conduit 38 and through packed section 39 is intimately contacted by a relatively small amount of hot dry stripping gas passing upwardly which enters conduit 38 through conduit 40.

The hot dry stripping gas strips additional water vapor from the liquid absorbent within conduit 38 thereby further reconcentrating it to a high purity. The percentage reconcentration obtainable depends on the volume of hot dry stripping gas entering conduit 38 and the amount of contact that takes place between the liquid desiccant solution and stripping gas. However, it has been found that triethylene glycol water solutions can be reconcentrated to high concentrations with relatively small amounts of stripping gas. For example, using a 6 inch diameter conduit with a 4 foot long section packed with 1″ Berl Saddles, a 50 gallon per hour stream of 98.1% by weight triethylene glycol water solution may be concentrated to a purity of 99.99% by weight with 550 standard cubic feet per hour of hot dry natural gas in a system of the type herein described.

The hot dry stripping gas, prior to entering conduit 38, passes through reconcentrator 30 within conduit 40 thereby becoming hot by heat exchange with hot liquid absorbent contained therein. Any source of relatively dry gas may be connected to conduit 40, but a portion of the dehydrated gas stream leaving contactor 10 is preferably utilized.

The lean liquid absorbent of high concentration passes out of conduit 38 directly into accumulator 27. Accumulator 27 functions as an accumulator for said liquid absorbent and also contains heat exchange coil 28 previously described. From accumulator 27 the liquid absorbent of high concentration passes through conduit 41 to suction side of pump 42 from where it is pumped into conduit 18 and then into contactor 10.

It should be noted that the rates of liquid absorbent entering contactor 10 may be varied by speeding up or slowing down pumps 38 and 42. Thus the system of the present invention may be adjusted after it is initially placed in operation in order to obtain the precise rates of moderate concentration and high concentration liquid absorbent required to obtain the desired gas stream water dew point depression.

It should be now apparent that the present invention requires substantially smaller and less costly equipment than other methods and systems heretofore known in the art primarily due to the fact that only a part of the total liquid absorbent circulated is reconcentrated to a high purity, the major portion of water removed from the gas stream being accomplished with liquid absorbent of moderate concentration.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention disclosed herein.

What is claimed is:

1. A method of dehydrating a gas stream which comprises:

contacting said gas stream with lean liquid absorbent of moderate concentration in a first stage of contact so that said gas stream is partially dehydrated;
contacting said partially dehydrated gas stream with lean liquid absorbent of high concentration in a second stage of contact so that it is further dehydrated;
separately removing rich liquiud absorbent from each contact stage and combining said rich absorbent;
introducing the resulting combined rich liquid absorbent from each stage of contact into a reconcentrator;
heating said rich liquid absorbent in said reconcentrator to a level at which it wil distill to a lean liquid absorbent of moderate concentration;
dividing said lean liquid absorbent of moderate concentration into a first portion and a second portion;
conducting said portion to said first stage of contact;
contacting said second portion with a relatively dry gas to further reconcentrate it to a lean liquid absorbent of high concentration; and
conducting said lean liquid absorbent of high concentration to said second stage of contact.

2. The method of claim 1 which is further characterized to include the step of passing said rich liquid absorbent in heat exchange relationship with said lean liquid absorbent of high contration and with said lean liquid absorbent of moderate concentration prior to introducing said rich liquid absorbent into said reconcentrator so that said rich liquid absorbent is preheated and said lean liquid absorbent is cooled.

3. The method of claim 1 wherein said liquid absorbent is a triethylene glycol-water solution.

4. The method of claim 3 wherein said rich triethylene glycol-water solution is heated in said reconcentrator to a level at which it will distill to a triethylene glycol-water solution having a concentration of about 98.1% triethylene glycol by weight.

5. The method of claim 3 wherein said second portion of lean triethylene glycol-water solution of moderate concentration is contacted with a relatively dry gas to further reconcentrate it to a triethylene glycol-water solution having a concentration of about 99.99% triethylene glycol by weight.

6. A system for dehydrating a gas stream which comprises:

a contactor in which said gas stream is dehydrated by contacting lean liquid absorbent in a first stage and then contracting further reconcentrated lean liquid absorbent in a second stage;
a reconcentrator for reconcentrating the rich liquid absorbent from said contactor by distillation;
connection means between the rich liquid absorbent outlets from each stage of said contactor and said reconcentrator for combining and introducing said rich liquid absorbent into said reconcentrator;
a first conduit disposed within said reconcentrator to receive a first portion of reconcentrated lean liquid absorbent;
means connected to said first conduit for transferring said first portion of lean liquid absorbent to said first stage within said contactor;
a second conduit disposed within said reconcentrator to receive a second portion of reconcentrated lean liquid absorbent;
means for further reconcentrating said second portion of lean liquid absorbent disposed within said second conduit; and
means connected to said second conduit for transferring said further reconcentrated lean liquid absorbent to said second stage within said contactor.

7. The system of claim 6 wherein the means for further reconcentrating said portion of lean liquid absorbent within said second conduit includes:

means for intimately contacting said second portion of lean liquid absorbent with dry gas; and
means for introducing said dry gas into said second conduit connected to a source of dry gas.

8. A system for dehydrating a gas stream which comprises:

a contactor in which said gas stream is dehydrated by contacting lean liquid absorbent in a first stage and then contacting further reconcentrated lean liquid absorbent in a second stage;

a reconcentrator for reconcentrating the rich liquid absorbent from said contactor by distillation;

a still column connected to said reconcentrator for refluxing said reconcentrator;

connecting means between the rich liquid absorbent outlets from each stage of said contactor and said still column for combining and introducing said rich liquid absorbent into said still column and reconcentrator;

a first conduit disposed within said reconcentrator to receive a first portion of reconcentrated lean liquid absorbent;

means connected to said first conduit for transferring said first portion of lean liquid absorbent to said first stage within said contactor;

a second conduit disposed within said reconcentrator to receive a second portion of reconcentrated lean liquid absorbent;

means for further reconcentrating said second portion of lean liquid absorbent disposed within said second conduit; and means connected to said second conduit for transferring said further reconcentrated lean liquid absorbent to said second stage within said contactor.

9. The system of claim 8 wherein the means for further reconcentrating said second portion of lean liquid absorbent within said second conduit includes:

means for intimately contacting said second portion of lean liquid absorbent with dry gas; and means for introducing said dry gas into said second conduit connected to a source of dry gas.

10. A system for dehydrating a gas stream which comprises:

a contactor in which said gas stream is dehydrated by contacting lean liquid absorbent in a first stage and then contacting further reconcentrated lean liquid absorbent in a second stage;

a reconcentrator for reconcentrating the rich liquid absorbent from said contactor by distillation;

a still column connected to said reconcentrator for refluxing said reconcentrator;

a heat exchanger disposed within said still column to cool said rich liquid absorbent and to condense reflux within said still column;

connection means between the rich liquid absorbent outlets from each stage of said contactor and said heat exchanger for combining and introducing said rich liquid absorbent into said heat exchanger;

a conduit connected to said heat exchanger and connected to said still column for introducing said rich liquid absorbent into said still column and reconcentrator;

a first conduit disposed within said reconcentrator to receive a first portion of reconcentrated lean liquid absorbent;

means connected to said first conduit for transferring said first portion of lean liquid absorbent to said first stage within said contactor;

a second conduit disposed within said reconcentrator to receive a second portion of reconcentrated lean liquid absorbent;

means for intimately contacting said second portion of lean liquid absorbent with dry gas disposed within said second conduit;

means for introducing said dry gas into said second conduit connected to a source of dry gas; and means connected to said second conduit for transferring said further reconcentrated lean liquid absorbent to said second stage within said contactor.

11. The system of claim 10 wherein said means connected to said first conduit for transferring said first portion of lean liquid absorbent to said first stage within said contactor comprises:

a heat exchanger connected to said first conduit to cool said lean liquid absorbent;

means for pumping said lean liquid absorbent connected to said heat exchanger; and a conduit connected to said means for pumping said lean liquid absorbent and connected to said contactor for introducing said lean liquid absorbent into said first stage within said contactor.

12. The system of claim 11 wherein said means connected to said second conduit for transferring said further reconcentrated lean liquid absorbent to said second stage within said contactor comprises:

an accumulator connected to said second conduit;

a heat exchanger disposed within said accumulator to cool said further reconcentrated lean liquid absorbent therein;

means for pumping said further reconcentrated lean liquid absorbent connected to said accumulator; and a conduit connected to said means for pumping said further reconcentrated lean liquid absorbent and connected to said contactor for introducing said further reconcentrated lean liquid absorbent into said second stage within said contactor.

References Cited

UNITED STATES PATENTS

| | | | |
|---|---|---|---|
| 3,102,012 | 8/1963 | Dowd | 55—43 |
| 3,105,748 | 10/1963 | Stahl | 55—32 |
| 3,212,238 | 10/1965 | Welch et al. | 55—31 |
| 3,347,019 | 10/1967 | Barnhart | 55—32 |

SAMIH N. ZAHARNA, Primary Examiner

C. N. HART, Assistant Examiner

U.S. Cl. X.R.

55—38, 208

PO-1050
(5/69)

UNITED STATES PATENT OFFICE
CERTIFICATE OF CORRECTION

Patent No. 3,492,787      Dated February 3, 1970

Inventor(s)      Robert E. McMinn

It is certified that error appears in the above-identified patent and that said Letters Patent are hereby corrected as shown below:

In Col. 2, Line 71 wherein instead of within

In Col. 3, Line 62 contactor instead of conactor

In Col. 5, Line 55 portion instead of porion

In Col. 6, Line 6 will instead of wil

In Col. 6, Line 10 insert the word first before the word "portion" and after the word "said"

In Col 6, Line 19 concentration instead of contration

In Col. 6, Line 41 contacting instead of contracting

In Col. 7, Line 5 connection instead of connecting

SIGNED AND
SEALED
JUL 7 1970

(SEAL)
Attest:

Edward M. Fletcher, Jr.
Attesting Officer

WILLIAM E. SCHUYLER, JR.
Commissioner of Patents